(12) United States Patent
Richter et al.

(10) Patent No.: US 7,449,504 B2
(45) Date of Patent: Nov. 11, 2008

(54) USE OF WAXES AS MODIFIERS FOR FILLED PLASTICS

(75) Inventors: Eric Richter, Thierhaupten (DE); Gerd Hohner, Gersthofen (DE)

(73) Assignee: Clariant Produkte (Deutschland) GmbH, Sulzbach (DE)

( * ) Notice: Subject to any disclaimer, the term of this patent is extended or adjusted under 35 U.S.C. 154(b) by 405 days.

(21) Appl. No.: 11/099,719

(22) Filed: Apr. 6, 2005

(65) Prior Publication Data

US 2005/0222311 A1   Oct. 6, 2005

(30) Foreign Application Priority Data

Apr. 6, 2004    (DE)    .............. 10 2004 016 790

(51) Int. Cl.
*C08L 97/02* (2006.01)
*C08L 91/06* (2006.01)

(52) U.S. Cl. .................... 524/13; 524/14; 524/16; 524/487; 523/205; 523/210

(58) Field of Classification Search ........ 524/275–279, 524/476–480, 487–489; 523/205–216
See application file for complete search history.

(56) References Cited

U.S. PATENT DOCUMENTS

| | | | | | |
|---|---|---|---|---|---|
| 2,038,113 | A | * | 4/1936 | Irey | ........................... 524/14 |
| 3,297,603 | A | * | 1/1967 | Mase | ......................... 264/126 |
| 3,598,773 | A | * | 8/1971 | Mitchell et al. | ............. 524/797 |
| 3,745,054 | A | | 7/1973 | Smedberg | |
| 3,869,414 | A | * | 3/1975 | Campbell | .................... 524/25 |
| 4,003,866 | A | * | 1/1977 | Paturle | ......................... 521/40 |
| 4,080,349 | A | * | 3/1978 | Wurmb et al. | ............... 524/514 |
| 4,245,061 | A | * | 1/1981 | Tachi et al. | .................. 525/286 |
| 4,276,208 | A | * | 6/1981 | Ogawa et al. | ............... 523/217 |
| 4,325,850 | A | | 4/1982 | Mueller | |
| 4,439,575 | A | | 3/1984 | Schwarz | |
| 4,598,019 | A | * | 7/1986 | Yokoyama | .................. 428/407 |
| 4,957,949 | A | * | 9/1990 | Kamada et al. | ............. 523/201 |
| 5,744,530 | A | * | 4/1998 | Skelhorn | .................... 524/427 |
| 5,969,014 | A | | 10/1999 | Webster et al. | |
| 5,998,547 | A | | 12/1999 | Hohner | |
| 6,039,798 | A | * | 3/2000 | Aldcroft et al. | ............. 106/272 |
| 6,060,538 | A | * | 5/2000 | Gallucci | ..................... 523/217 |
| 6,080,902 | A | | 6/2000 | Herrmann et al. | |
| 6,143,846 | A | | 11/2000 | Herrmann et al. | |
| 6,211,303 | B1 | | 4/2001 | Hohner | |
| 6,331,590 | B1 | | 12/2001 | Herrmann et al. | |
| 6,348,547 | B1 | | 2/2002 | Deckers et al. | |
| 6,384,148 | B1 | | 5/2002 | Herrmann et al. | |
| 6,407,189 | B1 | | 6/2002 | Herrmann | |
| 6,569,540 | B1 | * | 5/2003 | Preston et al. | ........... 428/537.1 |
| 6,646,027 | B2 | * | 11/2003 | Gallucci | ..................... 523/217 |
| 6,761,764 | B2 | | 7/2004 | Krendlingers et al. | |
| 6,800,681 | B2 | * | 10/2004 | Ohkawa et al. | ............. 524/318 |
| 6,964,746 | B2 | | 11/2005 | Schlosser et al. | |
| 7,192,909 | B2 | * | 3/2007 | Richter et al. | ............... 508/591 |
| 7,262,251 | B2 | * | 8/2007 | Kanderski et al. | ........... 525/240 |
| 2003/0144380 | A1 | * | 7/2003 | Clark et al. | ................. 523/205 |
| 2004/0254280 | A1 | | 12/2004 | Richter et al. | |
| 2005/0014866 | A1 | * | 1/2005 | Hohner et al. | .............. 523/210 |
| 2005/0038153 | A1 | | 2/2005 | Richter et al. | |
| 2005/0222310 | A1 | * | 10/2005 | Richter | ....................... 524/275 |

FOREIGN PATENT DOCUMENTS

| | | |
|---|---|---|
| DE | 149481 | 7/1981 |
| DE | 3112659 | 11/1982 |
| DE | 236934 | 6/1986 |
| DE | 10152229 | 4/2003 |
| DE | 10152228 | 5/2003 |
| EP | 1072645 | 1/2001 |
| EP | 1496450 | 1/2005 |

OTHER PUBLICATIONS

U.S. Appl. No. 11/099,718, by Richter, filed Apr. 6, 2005.
German Search Report for DE 102004015790.7, mailed Nov. 16, 2004.
English Abstract for SU 568564, Jan. 29, 1974.
H.P. Schlumpf, "Filler and Reinforcements" in R. Gachter, H. Muler, Plastics Additives, 3$^{rd}$ ed., Carl Hanser Verlag Munich pp. 525-591 (1993).
Ullmann's Encyclopedia of Industrial Chemistry, 5$^{th}$ Ed., vol. A 28, Weinhein Chapters 2.2, 2.3 & 3.1-3.5, pp. 110-126 (1996).
Ullmann's Enclyclopedia of Industrial Chemistry, 5$^{th}$ Ed., vol. A.28, Weinhe in chapters 6.1.1/6.1.2, 6.1.3 & 6.1.4, pp. 146-154 (1996).
USPTO Office Action for U.S. Appl. No. 10/239,606, mailed Sep. 1, 2004.
USPTO Office Action for U.S. Appl. No. 10/493,145, mailed Apr. 8, 2005.
English Abstract for JP 06-122820, May 6, 1994.
EP Search Report for EP 0500691, mailed Jul. 21, 2005.
English Abstract for JP 58015538, Jan. 28, 1983.

(Continued)

*Primary Examiner*—Peter Szekely
(74) *Attorney, Agent, or Firm*—Anthony A. Bisulca

(57) ABSTRACT

The invention relates to the use of waxes as modifiers for filled plastics.

13 Claims, No Drawings

OTHER PUBLICATIONS

U.S. Office Action for U.S. Appl. No. 10/493,187; mailed Dec. 14, 2005.
U.S. Office Action for U.S. Appl. No. 10/493,187; mailed Jun. 22, 2006.
U.S. Office Action for U.S. Appl. No. 10/493,187; mailed Feb. 22, 2007.
U.S. Office Action for U.S. Appl. No. 10/493,187; mailed Sep. 28, 2007.
U.S. Office Action for US Pat. 7,192,909; mailed Sep. 1, 2004.
U.S. Office Action for US Pat. 7,192,909; mailed Jun. 28, 2005.
U.S. Office Action for US Pat. 7,192,909; mailed Dec. 5, 2005.
English Abstract of JP 06-12280, May 6, 1994.

* cited by examiner

USE OF WAXES AS MODIFIERS FOR FILLED PLASTICS

The present invention is described in the German priority application No. 10 2004 016 790.7, filed Jun. 4, 2004, which is hereby incorporated by reference as is fully disclosed herein.

The invention relates to the use of waxes as modifiers for thermoplastics or thermosets which comprise fillers and which comprise these waxes.

Fillers generally mean pulverulent substances of organic or inorganic origin which are dispersed in organic media, dispersions, or emulsions with the aim of giving the respective final product certain properties or lowering its production cost. Fillers have to be divided into inorganic and organic materials. Particular importance is attached to calcium carbonate, calcium magnesium carbonate, aluminum silicates, silicon dioxide, magnesium silicates (talc), barium sulfate, aluminum potassium sodium silicates, metals, and metal oxides, aluminum hydroxides, carbon black and graphite, wood flour and cork flour, wood particles, wood fibers, glass fibers and natural fibers (H. P. Schlumpf, "Filler and Reinforcements" in R. Gächter, H. Müller, Plastic Additives, 3rd edition, Carl Hanser Verlag Munich 1993, pp. 525-591).

Fillers are widely used. Particular mention may be made here of the following applications related to synthetic materials: paints, coating materials, paper, construction materials, and adhesives. Depending on the application, various properties of the fillers are relevant. Typical parameters are refractive index, binder absorption, specific surface area, opacity, abrasion (process machinery wear), gloss, grain size, and grain size distribution. Particularly in the case of fibrous fillers, compatibility between the filler and the matrix is of particular interest. By way of example, glass fibers are coated with suitable substances in order to improve this coupling between the two materials.

In the course of the last decades, there has been a constant increase in the importance of fillers in plastics processing. In earlier times, fillers were added mainly either to lower the cost of the final product or to increase the quantity of the finished article; subsequently, however, the effect of fillers on processing properties or on finished-product properties has been utilized. Fillers could be used to optimize properties such as processing speed, dimensional stability, flammability, abrasion resistance, electrical tracking resistance, or mechanical properties. In the plastics processing sector fillers are particularly used in polyvinyl chloride, polyethylene, and polypropylene, and also in rubber (natural and synthetic non-crosslinked and crosslinked, e.g. via vulcanization, elastomers). There are only relatively few instances of addition of fillers to engineering thermoplastics (polycarbonate, polymethyl methacrylate, polyamide, polystyrene, etc.).

Wood-filled thermoplastics are established prior art for a very wide variety of applications. Materials incorporated here are wood flour, wood fibers, or wood particles at high concentrations. Filler levels of from 50 to 90% by weight are conventional here. Commercially available thermoplastics are used as matrix material. Mention may be made in particular here of polyvinyl chloride, polypropylene, and the various grades of polyethylene. Less frequently, engineering thermoplastics are also used, examples being polystyrene or other styrene polymers (e.g. ABS). Alongside the main constituents mentioned, the applications also use additives in order to optimize properties. For example, very small amounts of modified polymers are added in order to improve mechanical properties. Problems hitherto unsolved are the rapid aging of these materials on exposure to weathering and the poor dimensional stability resulting from water absorption by the wood incorporated into the plastic.

Surprisingly, it has been found that addition of waxes to filled plastics delivers advantages in performance. The use of appropriate products has a marked favorable effect on the property profile of the moldings. There is an increase in the level of mechanical properties relating to tensile and flexural stress.

Absorption of water by hydrophilic fillers is moreover retarded and reduced. At the same time, better dimensional stability is achieved. The invention therefore provides the use of waxes as additive for filled plastics.

The waxes preferably comprise synthetic or natural waxes.

The natural waxes preferably comprise petroleum waxes, montan waxes, animal waxes, and/or vegetable waxes.

The synthetic waxes preferably comprise fatty acids, fatty acid esters, fatty acid amides, Fischer-Tropsch waxes, polyolefin waxes, and/or polar-modified polyolefin waxes.

The natural waxes preferably comprise montan waxes.

Montan waxes are ester waxes and/or salts of carboxylic acids. They particularly comprise products of the reaction of the montan wax acids with polyhydric low-molecular-weight alcohols.

Examples of preferred natural waxes here are vegetable waxes, such as carnauba wax or candelilla wax, or waxes of animal origin, e.g. shellac wax. Suitable semisynthetic waxes are, by way of example, montan waxes which have been decolorized or, where appropriate, chemically modified, e.g. via esterification and/or via partial saponification. Appropriate materials are described by way of example in Ullmann's Encyclopedia of Industrial Chemistry, 5th Edn., Vol. A 28, Weinheim 1996 in chapters 2.2, 2.3, and 3.1-3.5, pp. 110-126.

The materials here preferably comprise entirely synethic non-polar or polar waxes, e.g. polyolefin waxes. Non-polar polyolefin waxes may be prepared via a thermal process to reduce the molecular weight of branched or unbranched polyolefins, or via direct polymerization of olefins. Examples of polymerization processes which may be used are free-radical processes, where the olefins, generally ethylene, are reacted at high pressures and temperatures to give waxes with a relatively high or relatively low degree of branching; and processes where ethylene and/or higher 1-olefins are polymerized with the aid of organometallic catalysts, such as Ziegler-Natta catalysts or metallocene catalysts, to give unbranched or branched waxes. Appropriate methods for preparing olefin homo- and copolymer waxes are described by way of example in Ullmann's Encyclopedia of Industrial Chemistry, 5th Edn., Vol. A 28, Weinheim 1996 in chapter 6.1.1/6.1.2 (high-pressure polymerization), chapter 6.1.3 (Ziegler-Natta polymerization, polymerization using metallocene catalysts), and also chapter 6.1.4 (thermal processes for reducing molecular weight), pp. 146-154. Polar polyolefin waxes are produced via appropriate modification of non-polar waxes, e.g. via oxidation using air or via grafting-on of polar olefin monomers, e.g. $\alpha,\beta$-unsaturated carboxylic acids and/or their derivatives, such as acrylic acid or maleic anhydride, and/or substituted and/or unsubstituted styrenes and/or vinylsilanes. it is also possible to prepare polar polyolefin waxes via copolymerization of ethylene with polar comonomers, e.g. vinyl acetate or acrylic acid; or via oxidative processes to reduce the molecular weight of relatively high-molecular-weight, non-waxy ethylene homo- and copolymers. By way of example, Ullmann's Encyclopedia of Industrial Chemistry, 5th Edn., Vol. A 28, Weinheim 1996, Chapter 6.1.5, p. 155 gives appropriate examples.

The polyolefin waxes preferably comprise homo- and copolymers of various alkenes.

The polyolefin waxes preferably comprise homo- and copolymers of ethene and of propene.

The polyolefin waxes preferably comprise homo- and copolymers prepared on a Ziegler or metallocene catalyst.

The polyolefin waxes preferably comprise polar-modified polyolefin waxes.

The polar-modified polyolefin waxes preferably comprise oxidation products or graft copolymers.

The graft copolymers preferably comprise products prepared by a free-radical route from polyolefin waxes described and from one or more polar monomers.

The monomers preferably comprise maleic anhydride, and alkoxy-substituted vinylsilanes, and styrenes.

The graft copolymers preferably comprise products with a drop point of from 90 to 170° C.

The graft copolymers particularly preferably comprise products with a drop point of from 110 to 150° C.

The graft copolymers preferably comprise products with a melt viscosity of from 0.1 to 10 000 mPas at 170° C.

The graft copolymers particularly preferably comprise products with a melt viscosity of from 1 to 1000 mPas at 170° C.

The graft copolymers preferably comprise products with a degree of grafting of from 0.1 to 20%.

The graft copolymers particularly preferably comprise products with a degree of grafting of from 2 to 10%.

The amount preferably used of the waxes is from 0.05 to 10% by weight, based on the filler.

The amount particularly preferably used of the waxes is from 0.5 to 5.0% by weight, based on the filler.

The fillers are particularly preferably inorganic and/or organic fillers.

The inorganic fillers preferably comprise calcium carbonate, calcium magnesium carbonate, aluminum silicates, silicon dioxide, magnesium silicates (talc), barium sulfate, aluminum potassium sodium silicates, metals and metal oxides, and/or aluminum hydroxides.

The organic fillers preferably comprise carbon blacks and graphite, wood flour and cork flour, wood particles, wood fibers, glass fibers and natural fibers, and/or organic pigments.

The amount preferably used of the fillers is from 1 to 99% by weight, based on the entire mixture.

The amount particularly preferably used of the fillers is from 50 to 90% by weight, based on the entire mixture.

The invention also provides a thermoplastic or thermoset, comprising from 1 to 99% by weight of a filler coated with the wax described.

The material preferably comprises a thermoplastic or thermoset comprising from 50 to 95% by weight of a wax-coated filler.

The thermoplastic, vulcanizable plastic (rubber), or thermoset preferably comprises polyvinyl chloride, HD (high-density) polyethylene, LD (low-density) polyethylene, LLD (linear low-density) polyethylene, polypropylene, natural rubber, synthetic rubber, polycarbonate, polymethyl methacrylate, polyamide, styrene polymers, and/or blends composed of various plastics.

There are various ways of introducing the wax into the mixture: for example, the wax may be applied in an existing or new step of a process in the form of an aqueous dispersion. It is also possible to apply a wax melt to the filler by spraying. It is also possible to homogenize a mixture composed of filler and wax in a mixing assembly (e.g. blade mixer). It is also possible to meter the wax directly, without any other premixing, directly into the processing machine by volumetric or gravimetric means and thus delay contact between the individual components until that point has been reached.

EXAMPLES

Commercially available wood particles were premixed with various waxes and with a commercially available HD polyethylene, and then this mixture was compounded in an extruder. The pelletized compounded materials were processed by means of injection molding to give moldings. These parts were subjected to various studies. A product readily available in the market was introduced into the tests as a comparison. These mixing specifications are indicated by B and represent the prior art.

Compounded material A comprises 70% by weight of wood particles and 30% by weight of HDPE.

Compounded material B comprises 1.5% by weight of a commercially available additive for the wood/polyethylene system and 70% by weight of wood particles, and 28.5% by weight of HDPE.

Compounded material C comprises 1.5% by weight of a maleic-anhydride-grafted metallocene polyethylene wax as additive for the wood/polyethylene system, and 70% by weight of wood particles, and 28.5% by weight of HDPE.

Characterization of the Novel Additive:
Polyethylene Wax Prepared via Metallocene Catalysis

| | |
|---|---|
| Drop point: | about 120° C. |
| Acid number: | about 40 mg KOH/g |
| Viscosity: | about 220 mPas at 140° C. |

Compounding: All of the pulverulent constituents were mixed homogeneously in a tumbling mixer. This mixture was processed to give pellets, using a corotating twin-screw extruder.

Production of test specimens: Standard dumbbell specimens to DIN EN ISO 294 were injection-molded for all of the tests.

Mechanical properties were determined to DIN EN ISO 178, DIN EN ISO 179 and DIN EN ISO 527. Water absorption was tested to DIN EN ISO 62.

| | A | B | C |
|---|---|---|---|
| Tensile modulus of elasticity [MPa] | 5730 | 5680 | 6880 |
| Tensile strength [N/mm$^2$] | 25.7 | 28.2 | 38.4 |
| Tensile strain [%] | 0.7 | 0.7 | 0.8 |
| Impact resistance [kJ/m$^2$] | 2.2 | 2.9 | 3.5 |
| Flexural modulus [MPa] | 4190 | 4070 | 4100 |
| Flexural strength [N/mm$^2$] | 24.4 | 29.7 | 40.3 |
| Flexural strain [%] | 0.8 | 0.9 | 1.2 |
| Water absorption after 20 days [%] | 114 | 112 | 107 |
| Water absorption after 50 days [%] | 116 | 115 | 113 |

The test values listed clearly show that compounded material C has by far the best properties.

The invention claimed is:

1. A process for modifying a polymeric composition during compounding, wherein the polymeric composition includes at least one plastic, wherein the at least one plastic is a thermoplastic and the at least one plastic has at least one filler, comprising the step of adding a modifier to the mixture of the at least one plastic and at least one filler, wherein the modifier is at least one wax, wherein the at least one wax is a maleic-anhydride-grafted metallocene polyethylene wax and wherein the at least one filler is selected from the group consisting of wood flour, cork flour, wood particles, wood fibers and natural fibers.

2. The process as claimed in claim 1, wherein the amount used of the at least one wax is from 0.05 to 10% by weight, based on the at least one filler.

3. The process as claimed in claim 1, wherein the amount used of the at least one wax is from 0.5 to 5.0% by weight, based on the at least one filler.

4. The process as claimed in claim 1, wherein the plastic comprises from 1 to 99% by weight of the at least one filler.

5. The process as claimed in claim 1, wherein the at least one plastic comprises from 50 to 90% by weight of the at least one filler.

6. The process of claim 1, wherein adding step further comprises adding the at least one wax in an aqueous dispersion.

7. A process for modifying a polymeric composition during compounding, wherein the polymeric position includes at least one plastic, wherein the at least one plastic is a thermoplastic and the at least one plastic has at least one filler, comprising the step of coating the at least one filler with a modifier to form coated particles and adding the coated particles to the plastic, wherein the modifier is at least one wax, wherein the wax is a maleic-anhydride-grafted metallocene polyethylene wax and wherein the at least one filler is selected from the group consisting of wood flour, cork flour, wood particles, wood fibers and natural fibers.

8. The process as claimed in claim 7, wherein the coating step further comprises spraying the at least one wax onto the at least one filler.

9. A process for modifying a polymeric composition during compounding, wherein the polymeric composition has at least one plastic, wherein the at least one plastic is a thermoplastic, comprising the step of mixing at least one filler and a maleic-anhydride-grafted metallocene polyethylene wax to form a mixture and adding the mixture to the at least one plastic, wherein the at least one filler is selected from the group consisting of wood flour, cork flour, wood particles, wood fibers and natural fibers.

10. A polymeric composition made in accordance with the process of claim 1.

11. A polymeric composition made in accordance with the process of claim 7.

12. ) A polymeric composition made in accordance with the process of claim 9.

13. A polymeric composition made in accordance with the process of claim 6.

* * * * *